United States Patent

[11] 3,626,872

| [72] | Inventor | Samuel J. Cully<br>East 6523 Broadway, Spokane, Wash. 99206 |
|---|---|---|
| [21] | Appl. No. | 59,287 |
| [22] | Filed | July 29, 1970 |
| [45] | Patented | Dec. 14, 1971 |

[54] TIE-DOWN PALLET
3 Claims, 6 Drawing Figs.

| [52] | U.S. Cl. | 108/55 |
|---|---|---|
| [51] | Int. Cl. | B65d 19/18 |
| [50] | Field of Search | 108/51–58; 214/10.5, 67; 105/369 UL; 244/118 R; 206/62 |

[56] References Cited
UNITED STATES PATENTS

| 2,634,931 | 4/1943 | Weitzel | 108/51 |
|---|---|---|---|
| 2,738,058 | 3/1956 | Hansen et al. | 206/62 |
| 2,809,796 | 10/1957 | Averill | 108/53 |
| 2,923,512 | 2/1960 | Campbell | 108/55 |
| 3,157,424 | 11/1964 | Hull | 294/67 |
| 3,298,327 | 1/1967 | Grimes | 108/57 |

*Primary Examiner*—Francis K. Zugel
*Assistant Examiner*—Glenn O. Finch
*Attorney*—Keith S. Bergman

ABSTRACT: A large supportive pallet, having self-contained tiedowns and alignment posts, to carry relatively large arrays of lumber in combined truck-rail transportation. The pallet is of sufficient rigidity to be movable in loaded condition by forklift truck. The particular configuration provides wooden supports for both lumber and pallet with an internal void to carry ancillary structures and an external configuration adapted to allow pallet stacking for transportation and storage. The pallet is designed to make possible the economical rail transportation of lumber with truck delivery to and from railheads.

Patented Dec. 14, 1971
3,626,872
2 Sheets-Sheet 1
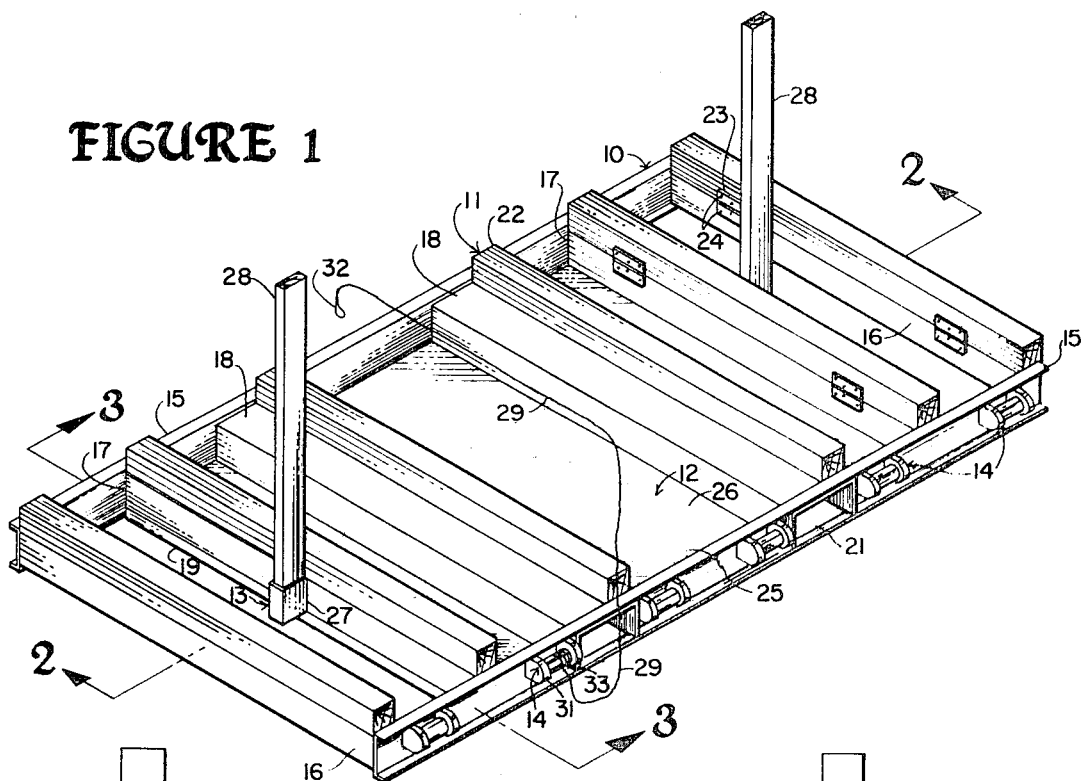
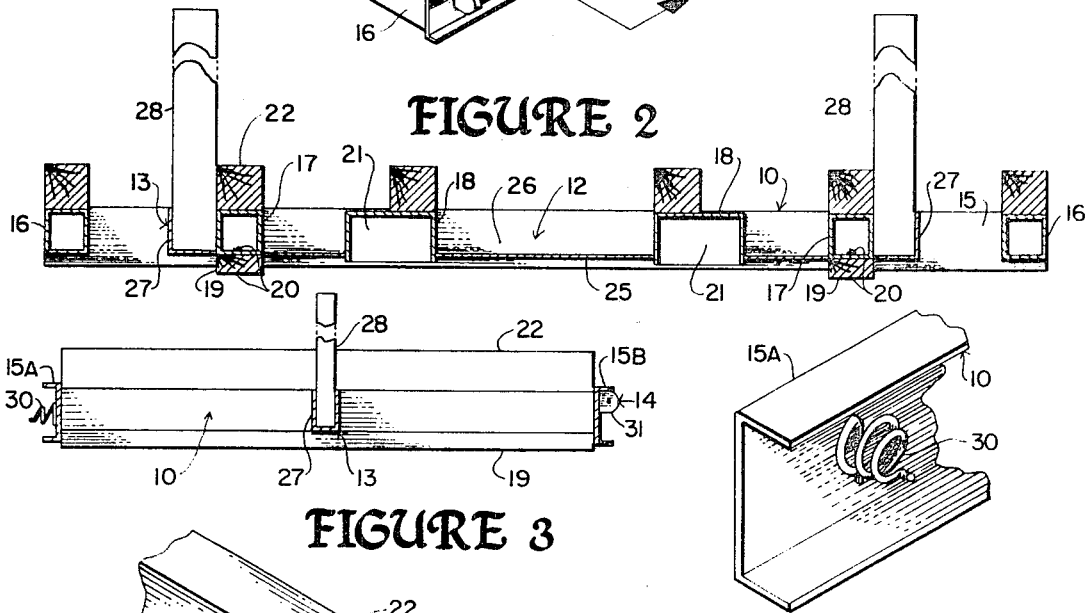
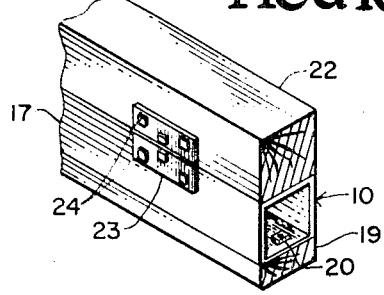
SAMUEL J. CULLY
INVENTOR.
BY
ATTORNEY.

TIE-DOWN PALLET

BACKGROUND OF INVENTION

1. Field of Invention

This invention relates generally to supportive pallets and more particularly to a pallet that has self-contained load fastening and aligning means and configuration to allow pallet stacking for transportation and storage.

2. Description of Prior Art

Lumber has relatively high ratio of volume to value and by reason of this, economic problems have arisen in its transportation. If lumber be moved by rail from production areas of the West to use areas of the East, aside from the direct rail transportation cost there is a substantial cost of handling, both in loading and unloading and transportation to and from the railhead; the total transportation costs, in some instances, approximates or surpasses the value of the lumber shipped. The complete transport of lumber by truck has become popular, especially in regional market areas in the West, but again this is economically feasible only if payloads can be found to be transported on the return trip, which oftentimes is not possible by reason of general economic conditions or the particular nature of the lumber carrier.

The instant invention seeks to provide a particular type of pallet that may be readily adapted to allow rail transportation of lumber over longer distances with ancillary trucking to and from terminal points with a minimum of handling expense involved in the transfer operations. My particular pallet differs from the prior art in providing a relatively large supportive surface of sufficient rigidity that it may support unitized arrays of lumber of the ordinary sizes of commerce and yet be moved between transporting vehicles, with load in supportive position, by a large size lift truck. The pallet provides self-contained supportive and fastening elements to maintain the load in proper position during transport and handling operations, provides internal facilities for storage of releasably positioned component parts and provides external configuration that allows stacking for simple and economic storage and transportation of the empty pallets.

SUMMARY OF INVENTION

To structurally accomplish my purposes, I provide a metallic peripheral frame with plural spaced crossed elements providing a planar supportive structure of some area and rigidity. At least two medial crosspieces are provided with laterally extending, medial channels to allow entry of the elongate tongues of a lift truck to allow transfer of the pallet. Wooden runners are provided on the undersurface to support the pallet and wooden crosspieces are hingeably supported by each pallet cross element to provide a wooden support for a load to be carried by the pallet. A bottom is provided in the medial portion of the pallet to form a five-sided, open-topped container for containment of removable fastening structures.

Plural spaced ratchet-type cable tighteners are spaced along one longer side element of the pallet and corresponding cable fastening hooks are spaced along the other side to allow cables to releasably extend therebetween to fasten a load to the pallet. Spaced brackets are provided in the medial part of cross elements to support vertically upwardly extending posts to maintain a load in appropriate vertical alignment. The whole structure is formed to present a rectilinear peripheral configuration adapted to stacking.

In providing such a structure it is:

A principal object of my invention to provide a large rigid pallet, for support of normal arrays of lumber, that has associated means to fasten the lumber thereto during handling and transit.

A further object of may invention to provide such a pallet that has means of maintaining supported lumber in appropriate vertical alignment during handling and transportation.

A further object of my invention to provide such a pallet that has depending wooden runners for support upon an underlying surface and hingeably movable wooden cross elements to support a load thereon.

A still further object of my invention to provide such a pallet that has internal means for carrying auxiliary removable fastening and aligning structures and an external configuration to allow stacking.

A still further object of my invention to provide a pallet that is of new and novel design, of rugged and durable nature, of simple and economic manufacture, and one otherwise well adapted to the uses and purposes for which it is intended.

Other and further objects of my invention will appear from the following specification and accompanying drawings. In carrying out the objects of my invention, however, it is to be understood that its essential features are susceptible of change in design and structural arrangement with only one preferred and practical embodiment being illustrated in the accompanying drawings as required.

BRIEF DESCRIPTION OF DRAWINGS

In the accompanying drawings which form a part of this application and wherein like numbers of reference refer to similar parts throughout:

FIG. 1 is an isometric surface view of my invention showing its parts, their configuration and relationship.

FIG. 2 is an elongate cross-sectional view of the invention of FIG. 1, taken on the line 2—2 thereon in the direction indicated by the arrows.

FIG. 3 is a transverse cross-sectional view of the invention of FIG. 1, taken on the line 3—3 thereon in the direction indicated by the arrows.

FIG. 4 is an enlarged, partial isometric view of one of the cable fastening pigtails.

FIG. 5 is an enlarged, partial isometric view of the hingeable joinder of wooden load support and pallet crosspiece.

DESCRIPTION OF PREFERRED EMBODIMENT

Figure 6:
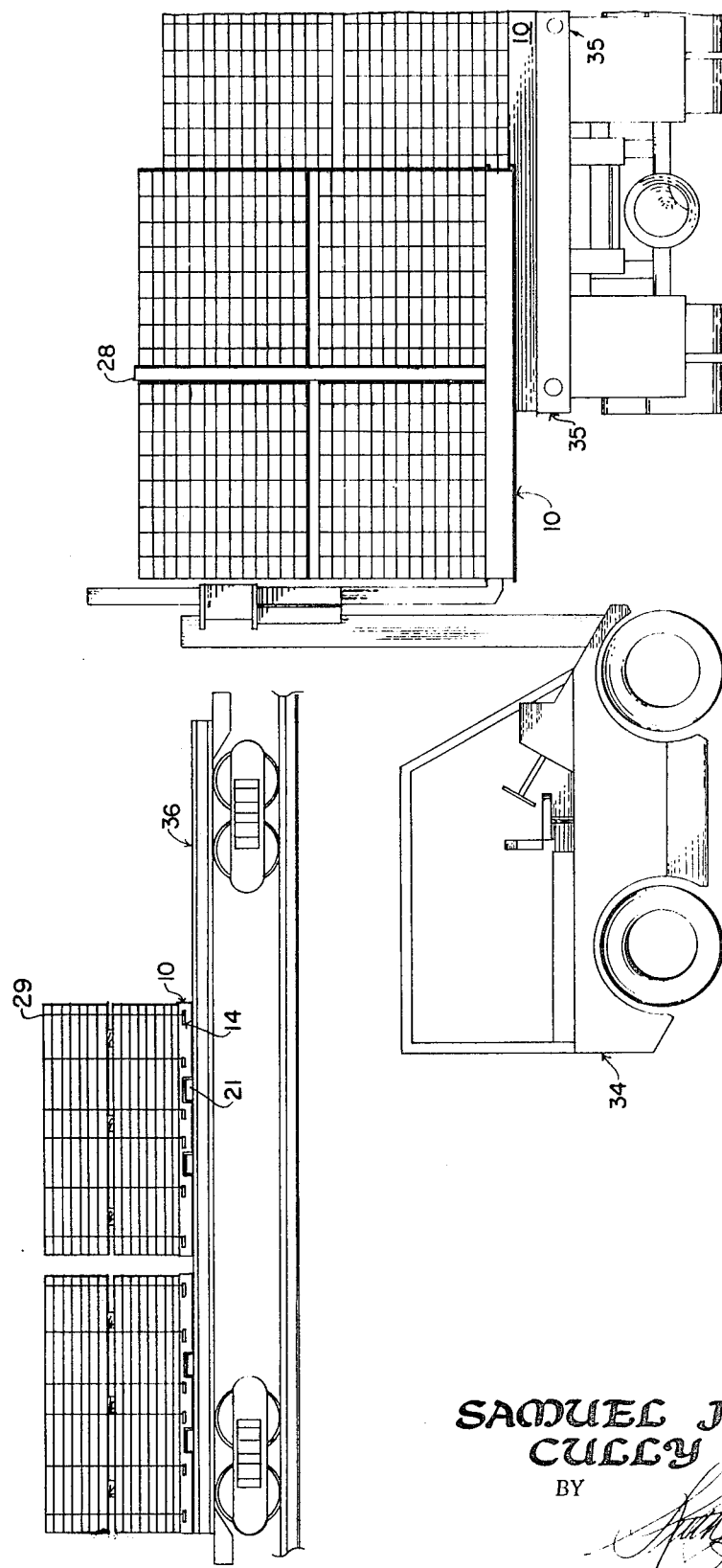
FIG. 6 is a pictorial view showing a loaded pallet of my invention being transferred from a truck to a railroad car by a forklift.

Referring now to the drawings in more detail and particularly to that of FIG. 1, it will there be seen that my invention comprises generally pallet body 10 carrying load supporting elements 11 and defining auxiliary structure container 12, with associated aligning means 13 and load fastening means 14.

Pallet body 10 is formed with a peripheral frame comprising paired, opposed, channel side elements 15 joined by paired, opposed, square end elements 16. At a spaced distance inwardly adjacent end elements 16 are square-beam-type crosspieces 17 and at a spaced distance inwardly adjacent these elements are laterally extending loading tine channel crosspieces 18. All of the foregoing structural elements of pallet body 10 are joined to form a rigid structure preferably by welding. Preferably end elements and crosspieces 16, 17 are coplanar in their upper surfaces but slightly less in depth than the depth of channel side elements 15 to allow wooden runners 19 to be affixed to the crosspieces by some fastening means 20, in this instance bolts, and project below the lower surface of side elements 15 to provide support for the entire structure on an underlying supportive surface. Normally to provide appropriate rigidity, the side elements are formed of approximately 5-inch channel beams and the end elements and crosspieces of 4-inch material so that the wooden runners 19 may be nominal 2×4 lumber of commerce to project approximately five-eighths inch below the lower surfaces of side elements 15.

Loading-tine channel crosspieces 18 are traversely extending U-shaped beams as illustrated having their medial channel 21 communicating through side elements 15. The two crosspieces are positioned in substantially parallel fashion at an appropriately spaced distance to receive the tines of a normal forklift, preferably about 8 feet apart. Since the weakest part of the pallet body will normally be in the side elements about the orifice of channel 21, it may be necessary to provide additional supporting bridging (not shown) in this area to provide appropriate rigidity for the pallet.

Load-supporting elements 11 are elongate wooden beams 22 of length slightly less than that of crosspieces 16, 17 18— that is to say, the distance between the opposed, inwardly facing surfaces of side elements 15. In the instance illustrated and with the dimensioning aforesaid, these beams would be nominally sized 4×4's. Each wooden beam 22 is provided with at least two hinges 23, the flanges of which communicate respectively with wooden member 22 and cross elements 16, 17, 18 by means of some appropriate fastener 24, in this instance screws extending into wooden supportive elements and bolts extending through the metallic cross elements. Beams 22 are so hinged that they will pivot between a raised position as shown in the drawing of FIG. 1 and a relaxed position (not shown) wherein they are pivoted downwardly and within the periphery of pallet body 10 immediately adjacent the cross element upon which they are pivotably supported.

Auxiliary structure container 12 is formed by establishing sheetlike bottom element 25 between crosspieces 17 to form an open-topped, five-sided container between each tine channel and outward crosspiece and between the two tine channels themselves. These chambers 26 may be used to contain the various releasably positionable fastening apparatus, tiedowns, covers and the like that oftentimes are necessarily associated with lumber carrying pallets.

Aligning means 13 comprise brackets 27 medially positioned on crosspieces 17 and adapted to hold in position vertically extending beamlike supports 28. Any number of such brackets may be associated with the interior surfaces of pallet body 10 but in practice normally two such medially positioned brackets are sufficient. The purpose of the aligning means is to maintain a carried load in properly aligned, substantially vertical position without lateral shifting during handling or transit. Normally supports 28 are of appropriate length that they also may be stored within chambers 26 of the auxiliary structure container, but if not the supports may be quite readily treated as an expendable.

Load-fastening means 14 comprise plural cables 29 releasably fastenable in laterally extending fashion at elongate spaced positions along the pallet body. Plural spaced pigtail hooks 30 are provided at spaced positions along the medial portion of side element 15A and paired opposed ratchet-type winches 31 are positioned on the outer face of side element 15B, in opposition to the pigtail hooks, to allow releasable positioning of cables 29 therebetween. The pigtail hooks are formed as the conical spiral illustrated to prevent accidental dislodgment of end loops 32 of cables 29 supported thereby without tension, as if the loop be placed over the spirals of the pigtail hook it will not normally fall off without being unwound. Each ratchet-type winch 31 provides rotatable axle 33 about which the other end of cable 29 may be fastened and tightened by aid of an auxiliary handle (not shown); this type of ratchet winch is well known in the trucking arts and is not part of my invention per se.

Having thusly described the structure of my invention, its operation may now be understood.

Firstly a plurality of the pallets of my invention are constructed according to the foregoing specification. The exact dimensioning of pallets is not critical, but normally with trade practices that presently exist the nominal external dimensioning of the pallet will be substantially 8×14 feet and to provide the rigidity required to support a normal load of this size the side channels will be formed of 5-inch material as previously stated with the other elements of corresponding size as set forth.

The pallets are delivered to a lumber producing facility where they are positioned upon some appropriate supportive surface for loading. The load-supporting elements are then moved to an upward or load-supporting position as illustrated in FIG. 1 and lumber positioned thereon in appropriate vertical array. Normally in current trade practice the lumber will be unitized by banding and the dimensioning of my pallet has been chosen to accept the normal modules of such practice - the pallet normally being adapted to accept lumber 16 feet in length with 4-foot unit modules being adaptable to the 8-foot width and an 8-foot height. Normally during loading, vertical supports 28 will be positioned between bundles of lumber to provide and maintain proper vertical alignment during transport.

With the lumber in position on the pallet, fastening cables 29 are then positioned, extending from pigtail hooks 30 across the load to an opposed ratchet winch 31, and the winches tightened to fasten the load rigidly to the pallet structure. If desired, sticking as previously used in the art, may be here used, especially to prevent damage to the loaded lumber by taunt cables.

In this condition, the loaded pallet is picked up by forklift truck 34, such as seen in FIG. 6, and positioned on hauling truck 35 for transport to a railhead. Normally trucks 35 of commerce will accept at least one 8×14 foot pallet, and with an elongate bed or trailer, at least two such pallets may be transported by one truck.

The whole then is transported to a railhead where again forklift 34 is operated to insert its tines within the tine channels, lift the loaded pallet from the truck and transfer it to a normal rail car 36. The nominal 60-foot rail car of commerce will accept three of my pallets in loaded condition. The loaded car is then transported to its destination and the operation repeated by removing the loaded pallet from the railcar and placing it on a truck for delivery to its ultimate destination.

In using my invention in commerce, a number of the pallets may be accumulated at the lumber destination, with cables, aligning supports 28 and any ancillary tarps, tiedowns or the like, accumulated within chamber 26 of auxiliary structure container 12 so that a number of pallets may be stacked vertically one upon the other. The group, after accumulation, may be returned to the point of origin for reuse. Normally in the back haul, the pallets may be stacked 19 high and three long on a 40-foot supportive surface such as a railroad car or truck and with today's prevailing transportation rates, the cost of return is something in the neighborhood of $2.00 or $3.00 per pallet.

From the foregoing description it is to be particularly noted that the initial loading and all subsequent steps dealing with lumber carried by my pallets may be mechanically accomplished to alleviate undue cost.

It is further to be noted that the pallet once loaded is dealt with mechanically and as a unit during transport again to cut costs of handling.

It is further to be noted that the pallet requires only a flat supportive surface without any additional elements to allow transportation, the pallet itself carrying its own fastening and aligning devices and providing sufficient strength to give a rigid supportive surface.

The foregoing description of my invention is necessarily of a detailed nature so that a specific embodiment of it might be set forth as required, but it is to be understood that various modifications of detail, rearrangement and multiplication of parts may be resorted to without departing from its spirit, essence or scope.

Having thusly described my invention, what I desire to protect by Letters Patent, and What I claim is:

1. A relatively large, rigid pallet for the support of lumber especially in mixed rail-truck transportation, comprising, in combination:

a rigid pallet body having a rectilinear peripheral frame with spaced parallel crosspieces and paired spaced loading tine channel crosspieces with loading tine channels extending laterally thereof to allow lateral access for the tines of a lift truck;

load-supporting elements pivotably communicating with the cross elements to be movable from a load-supporting position immediately above the cross element to a downwardly storing position below the upper surface of the pallet;

load-aligning means including internal brackets, medially positioned on the crosspieces, releasably carrying upwardly extending stakes to maintain a load on the pallet in appropriate vertical position; and load-fastening means carried by the pallet to releasably fasten a load securely thereto.

2. The invention of claim 1 having an auxiliary structure container formed by a bottom element extending between the lowermost portions of at least two of the cross elements.

3. The invention of claim 1 further characterized by the load fastening means comprising:

a plurality of spaced opposed winches and pigtail cable fasteners carried by the side edges of the pallet, said pigtail cable fasteners comprising a length of rod formed as a conical spiral.

* * * * *